United States Patent
Hathaway et al.

(10) Patent No.: US 8,856,954 B1
(45) Date of Patent: Oct. 7, 2014

(54) AUTHENTICATING USING ORGANIZATION BASED INFORMATION

(75) Inventors: Matthew R. Hathaway, Newton, MA (US); Richard Perkett, Marshfield, MA (US); Yedidya Dotan, Tel Aviv (IL); Bryan Knauss, Broadlands, VA (US); Raanan Lidji, Kfar Saba (IL)

(73) Assignee: EMC Corporation, Hopkinton, MA (US)

( * ) Notice: Subject to any disclaimer, the term of this patent is extended or adjusted under 35 U.S.C. 154(b) by 438 days.

(21) Appl. No.: 12/980,567

(22) Filed: Dec. 29, 2010

(51) Int. Cl.
*G06F 21/00* (2013.01)

(52) U.S. Cl.
USPC .......................................................... 726/28

(58) Field of Classification Search
CPC ......... G06F 21/00; G06F 21/10; G06F 21/31; G06F 21/6218; G06F 2221/2141; G06F 21/6245; H04L 9/32; H04L 63/102
USPC .......................................................... 726/28
See application file for complete search history.

(56) References Cited

U.S. PATENT DOCUMENTS

| | | | |
|---|---|---|---|
| 6,442,607 B1 * | 8/2002 | Korn et al. ..................... 709/225 |
| 7,231,657 B2 * | 6/2007 | Honarvar et al. ................. 726/2 |
| 7,353,184 B2 * | 4/2008 | Kirshenbaum et al. ....... 705/7.33 |
| 7,519,815 B2 * | 4/2009 | Morris et al. .................. 713/168 |
| 7,874,011 B2 * | 1/2011 | Boss et al. ....................... 726/28 |
| 7,996,910 B2 * | 8/2011 | Toomey ........................... 726/26 |
| 8,135,647 B2 * | 3/2012 | Hammad et al. ................ 705/67 |
| 8,225,396 B1 * | 7/2012 | Gauvin ............................ 726/22 |
| 8,359,639 B1 * | 1/2013 | Smith et al. ....................... 726/4 |
| 8,370,926 B1 * | 2/2013 | Satish .............................. 726/19 |
| 8,387,122 B2 * | 2/2013 | Toomim et al. ................... 726/5 |
| 8,407,766 B1 * | 3/2013 | Newstadt et al. .................. 726/4 |
| 8,457,974 B2 * | 6/2013 | Wang ............................. 704/275 |
| 2003/0126092 A1 * | 7/2003 | Chihara ........................... 705/67 |
| 2004/0128552 A1 * | 7/2004 | Toomey ......................... 713/201 |
| 2006/0194185 A1 * | 8/2006 | Goldberg et al. ............. 434/350 |
| 2006/0195353 A1 * | 8/2006 | Goldberg et al. .............. 705/10 |
| 2007/0143625 A1 * | 6/2007 | Jung et al. ..................... 713/182 |
| 2008/0168135 A1 * | 7/2008 | Redlich et al. ................ 709/204 |
| 2009/0249477 A1 * | 10/2009 | Punera ............................ 726/18 |
| 2010/0122340 A1 * | 5/2010 | Chow et al. ..................... 726/18 |
| 2011/0067094 A1 * | 3/2011 | Antell et al. ...................... 726/7 |
| 2011/0191838 A1 * | 8/2011 | Yanagihara ....................... 726/7 |
| 2012/0216260 A1 * | 8/2012 | Crawford et al. ................. 726/5 |

* cited by examiner

*Primary Examiner* — Eleni Shiferaw
*Assistant Examiner* — Nelson Giddins
(74) *Attorney, Agent, or Firm* — Krishnendu Gupta; Jason A. Reyes; Daniel P. McLoughlin

(57) ABSTRACT

A method is used in authenticating using organization based information. Organization based information is analyzed for information that is suitable for use in authenticating a user. The organization based information includes employee-used information. A question is derived from the organization based information. Based on the question, a process used to authenticate a user is executed.

16 Claims, 2 Drawing Sheets

FIG. 2 kba4e POC - Windows Internet Explorer http://127.0.0.1/8080/#questions.zul    g omaha airport File  Edit  View  Favorites  Tools  Help ☆ Favorites ☆ kba4e POC                                        Page ▾ Safety ▾ Tools ▾

Your current security settings put your computer at risk. Click here to change your security settings...

1) Which of the following people have you recently emailed?
   ○ Hawkins
   ○ Arcangelo
   ○ Hoa
   ○ Sarah
   ○ Kishore 2) Which of the following addresses have you recently emailed?
   ○ @attbi.com
   ○ @redev.net
   ○ @gainc.com
   ○ @citi.com
   ○ @quova.com 3) On which day do you have the meeting "Weekly NAP Status Call"?
   ○ Monday
   ○ Tuesday
   ○ Wednesday
   ○ Thursday
   ○ Friday 4) Which of the following items have you marked for follow-up recently?
   ○ Re: September 2010 Transaction Counts
   ○ Question about Jira KB-162
   ○ RE: KBA VS for IPR and next steps
   ○ RE: Flight cancellation
   ○ RDO Agenda and Action items

[Check]  [Try Again]

Done                                      Internet   100%

AUTHENTICATING USING ORGANIZATION BASED INFORMATION

TECHNICAL FIELD

This invention relates to authenticating using organization based information.

BACKGROUND OF THE INVENTION

Many computer users and other entities have systems that utilize some form of security. Therefore, there often arises a need to prevent all but selected authorized persons from being able to carry out some defined transaction or to gain access to electronic equipment or other system, facility or data. Preventing unauthorized clearance or access typically involves devices which limit access to the subject data, facility, or transaction to those who possess a unique physical device, such as a key or who know a fixed or predictable (hereinafter "fixed") secret code. In at least some cases, relying on a fixed code or unique physical device as the means to control such selective clearance or access can mean that would-be unauthorized users need only obtain possession of the fixed code or unique device to gain such clearance or access. Typical instances of fixed codes include card numbers, user numbers or passwords issued to customers of computer data retrieval services.

An information validation service known as RSA Identity Verification or Verid compiles, and enables verification of the identity of a user through inquiries into public record or publicly available information regarding the user's status and/or activities. It is not expected that the user would necessarily answer all questions to correspond exactly to the answers on file. Thus, there is a usual threshold set such as a majority of the questions, for example 2 out of 3 questions, will qualify as a pass, or alternatively for example, 2 out of 3 questions could trigger a second round of an additional number of questions. Based on the strength of the user's assertion, various options are available including posing further questions and/or re-directing the user to an alternate authentication approach. A server system accesses at least one information server having corresponding user specific answers to the authenticating questions. The server system poses the authenticating questions to the user and receives the user's answers. The user's answers are compared against the user specific answers for assessing a match threshold. If the match threshold meets a verification threshold, the user is authenticated.

In particular, Verid provides a question based screened verification method that includes asking an individual questions regarding the individual's asserted identity at an authorized location to determine whether the individual's asserted identity is correct. The questions are derived from external sources, such as credit reports from a third party, and may inquire into historical information regarding the individual's asserted identity, such as previous addresses.

SUMMARY OF THE INVENTION

A method is used in authenticating using organization based information. Organization based information is analyzed for information that is suitable for use in authenticating a user. The organization based information includes employee-used information. A question is derived from the organization based information. Based on the question, a process used to authenticate a user is executed.

BRIEF DESCRIPTION OF THE DRAWINGS

FIG. 2 is an example of a user interface that may be used with the techniques described herein.

DETAILED DESCRIPTION

Figure 1:
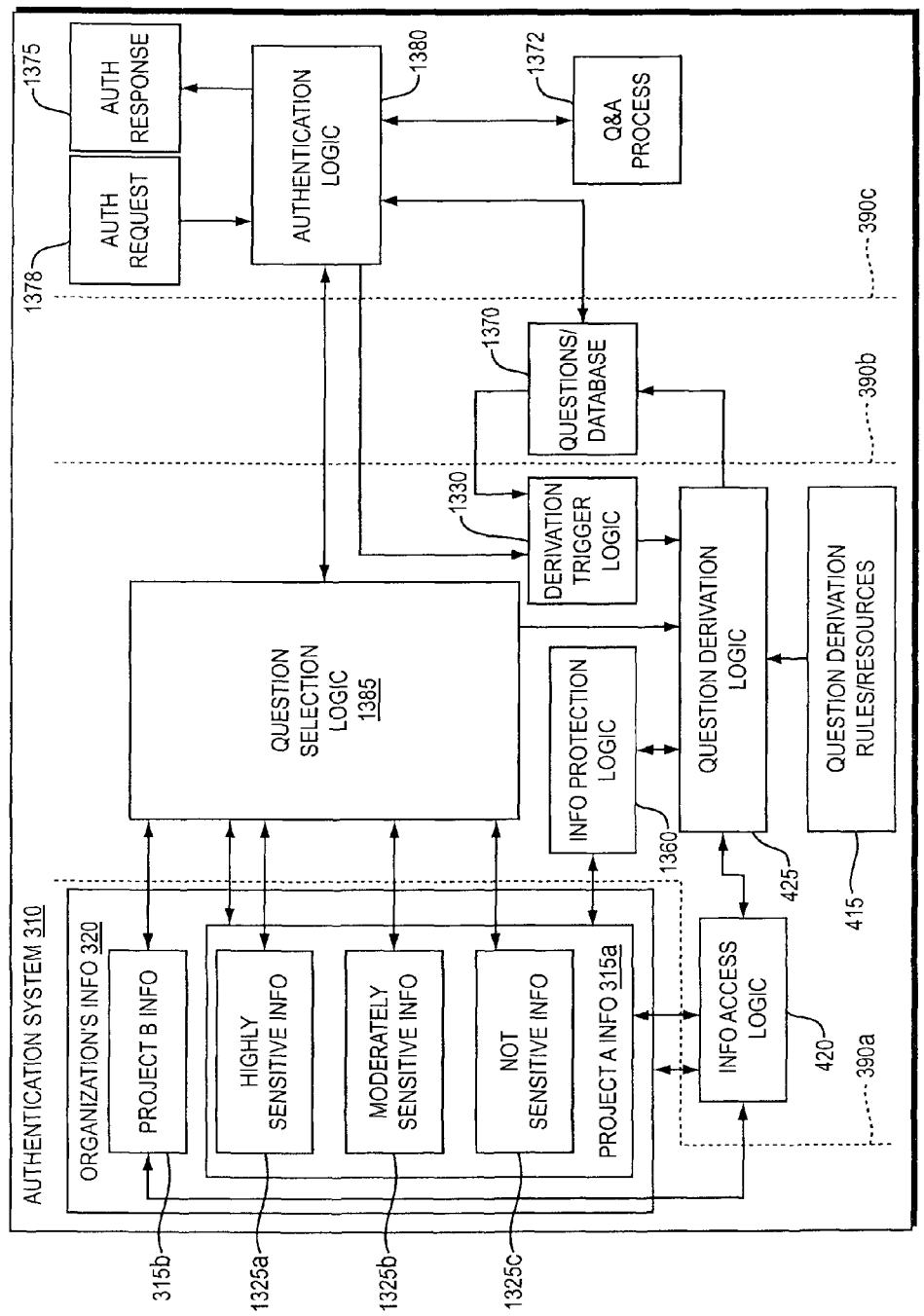
FIG. 1 is an example of an embodiment of a system that may utilize the techniques described herein.

Described below is a technique for use in authenticating using organization based information. In at least one implementation, the technique may be used to help provide a way to help organizations verify that a user is who they say they are in a mechanism that lowers overall costs while improving security and employee satisfaction. For example, in accordance with the technique, information about the user can be obtained from the organization's electronic mail system (e.g., Microsoft Exchange Server), such as emails, calendar items, tasks, and contacts. This information can be used to construct a series of challenge questions for a user that are personalized, dynamic, and intuitive for the real person corresponding to the user. These challenge questions can be used with or in lieu of other authenticators depending on the specific requirements of usability and security via multiple factors.

Examples of such challenge questions:
1. Which of the following people do you email regularly?
2. Which of the following people email you most often?
3. Which of the following people have you listed as a contact in Outlook?
4. Which of the following titles most closely match that of 'John Smith'?
5. Which of the following companies does 'John Smith' recently work for?
6. Which of the following subjects matches an email your received recently?
7. Which of the following tasks are you working on?

One or more implementations of the technique may be used in one or more of the following use cases:
1. Authentication in the call center for internal Help Desks
2. Online password resets to avoid cost of Help Desk calls and lost productivity
3. As part of one time password token provisioning, to help ensure the token is given to the right person
4. As part of token exception handling in the event the token fails or is lost or a disaster recovery scenarios
5. Challenge for tokenless authentication based on a risk based model Conventionally, with a fundamental part of any layered security strategy being the ability to authenticate a user, such authentication is done within business organizations through username/password combinations and one time passwords. Username/password combinations conventionally face challenges from Trojans, phishing sites, and other forms of social engineering attacks. In conventional systems, forcing passwords to be dynamic can result in an increase in exception handling procedures from forgotten passwords. Conventionally, one time password technology can be cost prohibitive for some applications, and since tokens can be lost or fail, an exception handling process for allowing access as well as re-issuing credentials is needed.

By contrast, at least one implementation of the current technique may provide one or more of the following advantages. Questions and answers are formulated from personal experience and history that is easy to recall and is always within the person's memory. Such a "mental fingerprint" is not as susceptible to being forgotten as a password that may have complex requirements such as combinations of special characters and case. It is also less likely to be lost as long as the user is of sound mind Referring now to FIG. 1, shown is an example of an embodiment of an authentication system 310 that may be used in connection with performing the technique described herein. Authentication logic 1380 receives an authentication request 1378 from or for a user, retrieves one or more questions 1370, executes a question and answer process 1372 with the user based on the questions, and based on the results of process 1372, issues an authentication response 1375.

Based on question derivation rules/resources 415, question derivation logic 425 derives questions 1372 from an organization's information 320 for use in testing the user's knowledge or familiarity with such information.

Derivation trigger logic 1330 controls when logic 425 derives at least some of questions 1372. For example, logic 1330 may be purely time based so that logic 425 derives a new or updated database of questions 1370 on a schedule, e.g., every hour or every day, to avoid using stale questions. In another example, questions 1370 may be derived on the fly or on demand; logic 1330 may be prompted by logic 1380 to cause questions 1370 to be derived in response to request 1378. In another example, logic 1330 may cause logic 425 to derive new questions when database 1370 is low on unused questions and needs replenishment.

Rules/resources 415 controls or affects how logic 425 derives at least some of questions 1372, including, for example, how to interpret and form questions from raw information of information 320. For example, resources 415 may direct how to derive a question "Which of the following names is the first name of your manager's manager?" from organizational chart information of information 320, or a question "Which of the following people has worked at the company the longest?" from length of service information, or a question "Which of the following names is the first name of the person in your last project who sent you an instant message most recently?" from project staffing information and instant messages logs.

Logic 425 accesses information 320 through information access logic 420, which may be necessary in at least some cases because at least some of information 320 may be the subject of access controls and may, for example, require a password or other credentials for access. In an example case of email information controlled by an email application such as Microsoft Exchange Server, logic 425 and/or logic 420 may need to log in with user or superuser or administrator credentials to be able to gain access to email messages or calendar information from which questions 1370 can be derived. In another example, logic 420 may be able to handle cases in which different credentials are needed for project A information 315A than for project B information 315B.

In at least some implementations, logic 425 may rely on information protection logic 1360 to help prevent derivation of questions 1370 that contain information that should not be revealed. For example, logic 1360 may help prevent any information about organization executives or pre-release products or litigation from being used to form questions 1370.

In at least some implementations, logic 1380 and/or logic 425 may rely on question selection logic 1385 to help select and/or derive questions based on the portion of information 320 that is the subject of request 1378 and/or the sensitivity of such portion. For example, if request 1378 pertains to access to project A information 315A, logic 1385 may help logic 1380 select from database 1370, and/or may help logic 425 derive, questions that help determine whether the user is a member of project A and/or is the type of user who should have access to information 315A.

In another example, if request 1378 pertains to access to project B information 315B, logic 1385 may help logic 1380 select from database 1370, and/or may help logic 425 derive, questions that avoid revealing any information about project A or any information beyond information 315B.

In another example, if request 1378 pertains to access to not sensitive information 1325C, logic 1385 may help logic 1380 select from database 1370, and/or may help logic 425 derive, a small number of general questions.

In another example, if request 1378 pertains to access to moderately sensitive information 1325B, logic 1385 may help logic 1380 select from database 1370, and/or may help logic 425 derive, a moderate number of targeted questions.

In another example, if request 1378 pertains to access to highly sensitive information 1325B, logic 1385 may help logic 1380 select from database 1370, and/or may help logic 425 derive, a large number of specifically targeted and/or intrusive questions intended to authenticate the user to a correspondingly high confidence level.

Depending on the implementation, all, some, or none of system 310 may be provided and/or execute within or outside of the organization (e.g., within or outside of the organization's firewall). For example, if all of system 310 is provided and executes within the organization, system 310 may be used to help control flow of and access to information within the organization. In another example, if all of system 310 except for information 320 is provided and executes outside of the organization, system 310 may be used to help control external access to the organization's internal information.

FIG. 1 dashed lines 390A, 390B, 390C help illustrate other examples wherein some of system 310 is provided and executes within of the organization. In the case of line 390C which defines inside of the organization as to the left of line 390C and outside of the organization as to the right of line 390C, authorization requests and responses and the Q&A process are handled by authentication logic 1380 outside of the organization but all other aspects of system 310 are provided and executes within of the organization, so that the only information released outside of the organization prior to authentication are the questions that are actually used. An example of this case is a virtual appliance server running in its own context on the organization's internal computer system.

In the case of line 390B, the situation is the same as in the case of line 390C except that questions database 1370 is also stored outside of the organization, so that the only information released outside of the organization prior to authentication are the questions.

In the case of line 390A, all of system 310 except information 320 itself is provided and executes outside of the organization. An example of this case is an externally hosted service providing authentication services to the organization.

Depending on the implementation, a system used with the technique described herein may have one or more of the following aspects.

If questions are to be derived from email information, it may be necessary for such information to be hosted internally to the organization and not through webmail or a cloud based service.

Questions derived using the technique may be fed into an existing system that prompts the user with one or more questions prior to grant of access.

A standalone product may be provided, e.g., that is integrated with a customer relationship management (CRM) offering. For example, internally to the organization, if an IT related request is made by a user providing an employee number, a CRM screen may be provided with questions for use in authenticating the user based on the employee number provided.

In the case of Microsoft Exchange Server email information serving as organization information from which questions are derived, access to such information may be gained through a client/server Web service interface or through emulating a Microsoft Outlook email client (e.g., using Web-based Distributed Authoring and Versioning (WebDAV)). By logging in as a superuser, the system can gain access to a user's mailbox without needing to log in as the user. Once the system has such access, the system can derive questions from any email system information, including calendars and task lists. Similar processes can be used with other applications and systems, including IBM Lotus Domino and SAP Enterprise Resource Planning (ERP) systems (which have organizational information).

Results of authentication work by the system can be used for any or nearly any purpose, e.g., to allow external VPN access to the organization's systems.

The system may be configured to avoid excessively exposing information through the questions, and to avoid making the user uncomfortable. The system may avoid exposing specific information about email contents, and may rely only on names or first names. In particular, the system may be configured for sensitivity regarding the organization's information in addition to or instead of the user's information. Some users (such as executives) may be on a list that helps ensure that questions do not expose any of such users' information at all.

For example, questions may ask which of certain listed people the user has emailed recently, e.g., usually outside of the organization, or about information from the user's task list or calendar. For example, recurring meetings with one or two people may be easy for the user to remember. Other sources of information include organizational charts, training history, and employee rating history.

The system may be configured to fit one of two scenarios in particular: resistance to outsider access, and differentiating among employees within the organization, especially with respect to social engineering attacks.

Since the system can derive questions from the to-be-accessed information itself, the system can be used to set up access controls automatically, by testing the user's existing familiarity with such information, which saves manual steps.

The system can be used to provide gradations of access, and to allow for drilling down more on the user with respect to iterations of question and answer processes before granting access, depending on the user's level of permissions.

In the case of access to equipment for maintenance, the system may be used to ask the user which customer the user recently worked with on maintenance, based on problem reports and/or trouble tickets.

Examples of questions are listed below and in a sample user interface screen illustrated in FIG. 2.

1. Which of the following people do you email regularly?

(The system may select a person that is not in the most common 10% because that could be a manager or an employee which is more researchable or knowable by co-workers. The system may select a person whose department is different from the employee being authenticated, or who has a domain from outside the organization, which may be less researchable.)

2. Which of the following people email you most often?

3. Which of the following people have you listed as a contact in Outlook?

(The system may select a person with a low but steady volume of emails.)

4. Which of the following titles most closely match that of 'John Smith'?

(The systems may avoid titles such as Vice President, SVP, Senior Director, that may be more widely known.)

5. Which of the following companies does 'Jane Smith' work for?

(The system may select a person that has a domain from outside the company, and a person with a low but steady volume of emails.)

6. Which of the following subjects matches an email you received recently?

(The system may select an email that the person responded to or forwarded. In at least some cases, the more emails in the thread, the better since it is more top of mind for the person.)

7. Which of the following tasks are you working on?

(The system may select a task created within the last 15 days and may avoid one word tasks as they may be too vague to recognize.)

As described above, authentication system 310 in accordance with the technique may be used to help securely authenticate the identity of the user. As used herein, "authenticate" means to verify the identity of a user, and so "authenticate" and "verify" can be used interchangeably throughout. Also, although the specification discusses, for simplicity, authentication of "users," it should be understood that "users" means any entity requiring authentication such as, for example, a person, animal, device, machine, or computer. The inclusion of a single user is exemplary, and typically the system can be used to authenticate a large number of users. Similarly, the inclusion of a single authentication system or logic 1380 is exemplary, and typically a user can have an authentication attempt verified by one or more of a large number of instances of logic 1380. In some embodiments, single authentication logic 1380 may be able to verify a user, while in other embodiments, two or more instances of logic 1380 may perform this task.

Authentication system 310 and/or or logic 1380 can be any sort of device that implements the functions described herein. In one embodiment, at least some of system 310 and/or logic 1380 may be implemented as software running on an actual or virtual server class computer including a processor, memory, and so on, to enable authentication of a large number of users, for example, in an enterprise. At least some of system 310 and/or logic 1380 can also be implemented as software running on a desktop computer, laptop computer, special-purpose device, or personal digital assistant (PDA). For example, at least some of system 310 and/or logic 1380 can be implemented as a software program running on a general-purpose computer, possibly interacting with one or more other computer programs on the same or a different computer. Some or all of the system 310 and/or or logic 1380 functionality can be implemented in hardware, for example in an Application Specific Integrated Circuit (ASIC). In still further embodiments, at least some of system 310 and/or logic 1380 can be implemented in a cellular telephone, or specialized hardware embedded in a cellular telephone and adapted to interact with the cellular telephone's circuitry. Other sizes, shapes, and implementations are possible without departing from the spirit of the invention.

Authentication can result in the performance of one or more actions including, without limitation, providing access or privileges, taking action, or enabling some combination of the two. Access includes, without limitation: access to a physical location, communications network, or a computer system; access to such services as financial services and records, or health services and records; or access to levels of information or services. The user and at least some of system 320 and/or logic 1380 can be physically near one another or far apart.

As described, a user can communicate with logic 1380. Logic 1380 can optionally provide a user interface. Communication between the user and logic 1380 can take place via this user interface. The user interface may provide an input interface, an output interface, or both. An input interface may enable the user to communicate information to logic 1380. The input interface can be any mechanism for receiving user input, and can include, without limitation: a keypad or keyboard; one or more push buttons, switches or knobs; a touch sensitive screen; a pointing or pressing device; a trackball; a device for capturing sound, voice or handwriting; a device for capturing biometric input (such as a fingerprint, retina or voice characteristic). An output interface may enable logic 1380 to communicate information to the user and can be any mechanism for communicating to a user, including, without limitation: a visual display to support alphanumeric characters or graphics such as a LCD display or LED display; an electrophoretic display; one or more light sources; a loudspeaker, a sound or voice generator; a vibration interface. In some embodiments, the user may provide, via the user interface, identifying information (such as a user identifier, PIN, or password, or a biometric characteristic such as a fingerprint, retina pattern, or voice sample), or possessions (such as physical keys, digital encryption keys, digital certificates, or authentication tokens) to logic 1380.

Logic 1380 can take various forms in various embodiments of the current technique, provided that logic 1380 performs the functions required of logic 1380 for secure authentication. Logic 1380 can be implemented in packages having a wide variety of shapes and form factors. For example, logic 1380 can be a smartphone sized and shaped device, or can be much smaller or much larger. One smartphone sized embodiment of logic 1380 includes a microprocessor with on-board memory, a power source, and a small LCD or LED display. The embodiment optionally includes a keypad or buttons for PIN entry, entry of authentication information requests, or for other entry or interaction with logic 1380. In another embodiment, a smartphone sized device may be a device or peripheral device combined with, and able to communicate with, a computer, telephone, or other device, such as a USB dongle or a Global Positioning System ("GPS") receiver. In still other embodiments, logic 1380 can be a desktop computer, laptop computer, or personal digital assistant (PDA). For example, logic 1380 can be implemented as a general-purpose computer running a software program that possibly interacts with one or more other computer programs or devices on the same or a different computer or device. For example, logic 1380 may include a web-browser with a plug-in software component. In still further embodiments logic 1380 can be a cellular telephone, or a cellular telephone with specialized embedded hardware adapted to interact with the cellular telephone's circuitry, such as a SIM card. In this example and in others, logic 1380 can be two components in communication with each other, for example a wireless communications device (e.g., mobile telephone) and a removable accessory, such as a SIM card. Other sizes, shapes, and implementations are possible without departing from the spirit of the invention.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

The invention claimed is:

1. A processor-executed method for use in authenticating a user corresponding to an authentication request originating on a first device, using organization based information corresponding to an organization, comprising:
   in response to the authentication request, on a second one or more devices corresponding to the organization:
      analyzing the organization based information for information that is suitable for use in authenticating the user, wherein the organization based information comprises employee-used information and sensitive information that should not be revealed in authenticating the user, and wherein the sensitive information is information sensitive to the organization; and
      deriving a question from the organization based information, wherein the act of deriving includes preventing the sensitive information from being used to derive the question; and
   based on the question, executing a process used to authenticate the user;
   wherein the organization based information includes information having different levels of sensitivity, wherein the authentication request pertains to one of the levels, and wherein the act of deriving includes deriving the question based on the level of sensitivity.

2. The method of claim 1, wherein the question is used with other authenticators to authenticate the user.

3. The method of claim 1, wherein the process is used for authenticating in online password resets.

4. The method of claim 1, wherein the process is used for authenticating as part of one time password token provisioning.

5. The method of claim 1, wherein the first device is located outside of a firewall of the organization, and wherein the one or more second devices are located within the firewall such that the acts of analyzing and deriving are performed within the firewall.

6. A processor-executed method for use in authenticating a user corresponding to an authentication request originating on a first device, using organization based information corresponding to an organization, comprising:
   in response to the authentication request, on a second one or more devices corresponding to the organization:
      analyzing the organization based information for information that is suitable for use in authenticating the user, wherein the organization based information comprises electronic mail information and sensitive information that should not be revealed in authenticating the user, and wherein the sensitive information is information sensitive to the organization; and
      deriving a question from the organization based information, wherein the act of deriving includes preventing the sensitive information from being used to derive the question; and
   based on the question, executing a process used to authenticate the user;
   wherein the organization based information includes information having different levels of sensitivity, wherein the authentication request pertains to one of the levels, and wherein the act of deriving includes deriving the question based on the level of sensitivity.

7. The method of claim 6, wherein the question pertains to which subjects match an email the user received.

8. The method of claim 6, wherein the question pertains to which tasks the user is working on.

9. The method of claim 6, wherein the first device is located outside of a firewall of the organization, and wherein the one or more second devices are located within the firewall such that the acts of analyzing and deriving are performed within the firewall.

10. A system for use in authenticating a user corresponding to an authentication request originating on a first device, using organization based information corresponding to an organization, comprising:
  one or more microprocessors;
  a second one or more devices corresponding to the organization, including:
    first logic, for execution by at least one of the one or more microprocessors, to analyze the organization based information for information that is suitable for use in authenticating the user in response to the authentication request, wherein the organization based information comprises employee-used information and sensitive information that should not be revealed in authenticating the user, wherein the sensitive information is information sensitive to the organization;
    second logic, for execution by at least one of the one or more microprocessors, to derive a question from the organization based information; and
    information protection logic, for execution by at least one of the one or more microprocessors, to prevent the sensitive information from being used to derive the question; and
  third logic, for execution by at least one of the one or more microprocessors, to execute, based on the question, a process used to authenticate the user;
  wherein the organization based information includes information having different levels of sensitivity, wherein the authentication request pertains to one of the levels, and wherein the execution by the one or more microprocessors includes derivation of the question based on the level of sensitivity.

11. The system of claim 10, wherein the question is used with other authenticators to authenticate the user.

12. The system of claim 10, wherein at least the one or more second devices are located within a firewall of the organization, and wherein the first device is not located within the firewall.

13. A system for use in authenticating a user corresponding to an authentication request originating on a first device, using organization based information corresponding to an organization, comprising:
  a one or more microprocessors;
  a second one or more devices corresponding to the organization, including:
    first logic, for execution by at least one of the one or more microprocessors, to analyze the organization based information for information that is suitable for use in authenticating the user in response to the authentication request, wherein the organization based information comprises electronic mail information and sensitive information that should not be revealed in authenticating the user, wherein the sensitive information is information sensitive to the organization;
    second logic, for execution by at least one of the one or more microprocessors, to derive a question from the organization based information; and
    information protection logic, for execution by at least one of the one or more microprocessors, to prevent the sensitive information from being used to derive the question; and
  third logic, for execution by at least one of the one or more microprocessors, to execute, based on the question, a process used to authenticate the user;
  wherein the organization based information includes different levels of sensitivity, wherein the authentication request pertains to one of the levels, and wherein the execution by the one or more microprocessors includes derivation of the question based on the level of sensitivity.

14. The system of claim 13, wherein the question pertains to which people the user emails.

15. The system of claim 13, wherein the question pertains to which people the user lists as contacts.

16. The system of claim 13, wherein at least the one or more second devices are located within a firewall of the organization, and wherein the first device is not located within the firewall.

* * * * *